June 18, 1940.  G. K. NEWELL  2,204,814
FLUID COMPRESSOR
Filed Jan. 28, 1939
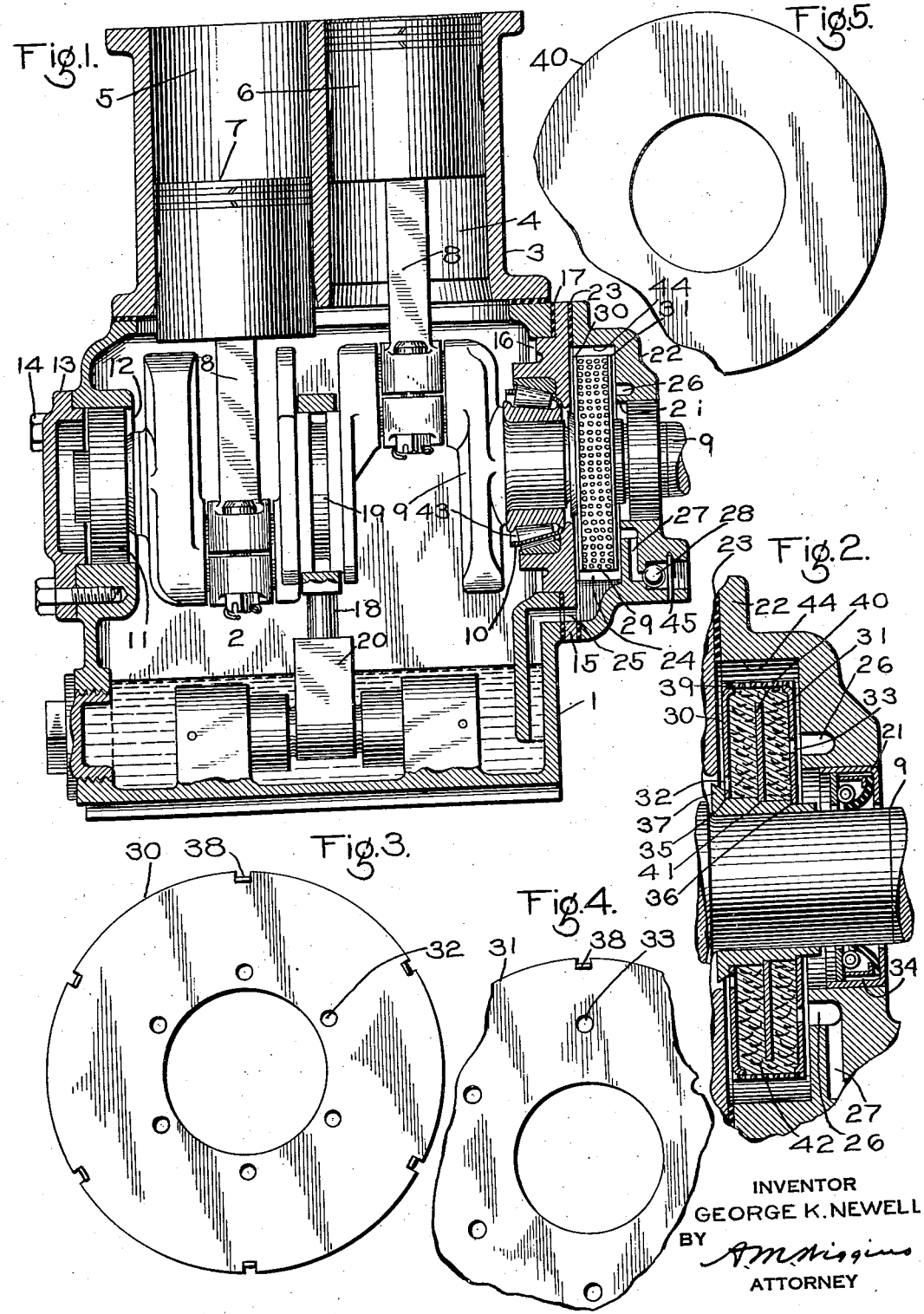
INVENTOR
GEORGE K. NEWELL
BY
A. M. Higgins
ATTORNEY Patented June 18, 1940

2,204,814

UNITED STATES PATENT OFFICE 2,204,814

FLUID COMPRESSOR

George K. Newell, near Pitcairn, Pa., assignor to The Westinghouse Air Brake Company, Wilmerding, Pa., a corporation of Pennsylvania Application January 28, 1939, Serial No. 253,318

10 Claims. (Cl. 230—206)

This invention relates to fluid compressors and more particularly to fluid compressors of the reciprocating type provided with means for removing oil and oil vapor from the air leaving the crank case chamber.

In fluid compressors of this type it is usual practice to provide a breather in the crank case chamber through which air leaving the chamber to the atmosphere must pass. The breather in many instances comprises a mass of porous material, such for example as curled hair, glass, wool, etc., located in a restricted passage leading from the crank case chamber to the atmosphere. The breather prevents a build up of pressure in the crank case chamber which may result from leakage past the piston rings.

It will be understood that upon continued reciprocation of the piston, air may be continually forced out of and sucked into the crank case chamber. The air thus forced out of the crank case chamber carries in suspension some oil which when forced to the atmosphere is lost.

One object of the present invention is to provide a fluid compressor of the reciprocating type having a breather device so constructed and arranged as to remove oil and oil vapor from the air leaving the crank case chamber.

A more specific object of the invention is to provide a centrifugal oil separator located in the crank case breather passage and so arranged as to separate oil from the discharged air and to return the oil to the crank case chamber.

Other objects and advantages will appear from the following more detailed description of the invention.

In the accompanying drawing, Fig. 1 is a diagrammatic view, mainly in section, of a fluid compressor embodying my invention; Fig. 2 is a diagrammatic view of the centrifugal oil separator and breather in place on the crank shaft; Fig. 3 is a view showing the inner or left hand plate of the centrifugal oil separator shown in Fig. 2; Fig. 4 is a fragmentary view of the outer or right hand plate of the centrifugal oil separator shown in Fig. 2; and Fig. 5 is a fragmentary view of the intermediate plate of the centrifugal oil separator shown in Fig. 2.

Referring more particularly to Fig. 1 of the drawing, the compressor comprises a sectional casing consisting of a crank case defining a crank case chamber 2, and a cylinder section 3 provided with cylinders 4 and 5, in which pistons 6 and 7 respectively are mounted to reciprocate. The cylinder section may be connected in any suitable manner to the crank case section 1.

The pistons 6 and 7 are connected in the usual manner by connecting rods 8 to a crank shaft 9, which is journaled in roller bearings 10 and 11 at each end of the crank case section 1.

The roller bearing 11 at the one end of the crank shaft is supported in a cylindrical bearing chamber 12 formed in the crank case section 1, and supports the rotatable crank shaft 9 at this end. The opening at this end of the crank case is closed by a cover plate 13 which is secured to the casing 1 by means of bolts 14 as shown.

The roller bearing 10 at the opposite end of the crank shaft is supported in a bearing plate 15 disposed in the end opening 16 of the casing 1. A gasket 17 is provided between the bearing plate 15 and the casing 1 which serves to seal the space between the two members and thus prevent lubricant from flowing to the exterior of the casing.

Contained in the crank case chamber 2 are the lubricating means, which for the purpose of simplification are shown principally in outline only. Briefly described, this means comprises a lubricating pump piston 18 connected in the usual manner to an eccentric 19 on the crank shaft 9, so that as the crank shaft is rotated the piston 18 is reciprocated within a bore of the pump casing 20, in the well known manner, to supply lubricant from the crank case chamber 2 to the desired points of the fluid compressor, as more particularly shown, described and claimed in Patent No. 2,110,720, granted to P. L. Crittenden, on March 8, 1938.

The crank shaft 9 extends to the right beyond the bearing plate member 15 and through an opening 21 in an end cap member 22. The end cap member is secured to the bearing plate member with an intervening sealing gasket 23.

According to the invention, the end cap member 22 is provided with a chamber 24 which is connected at its bottom by a passage 25 to the crank case chamber 2 below the oil level in the crank case chamber, and is further connected to the atmosphere by an annular passage 26 in the member 22 and a connecting passage 27 which leads past a ball check valve 28. Loss of the ball check valve is prevented by a pin 45.

Disposed in the chamber 24 is a combined breather and centrifugal oil separator indicated in its entirety by 29. This device comprises three spaced annular plates 30, 31 and 40 secured at their inside diameters to a spider or sleeve member 37 rigid with the crank shaft 9. Circumscribing the peripheries of these plates and secured, as by soldering, to the two outermost plates on spaced lugs 38 projecting from each, is a cylindrical foraminous member 39, which with the three mentioned spaced plates forms two annular chambers each containing a mass of straining material 42, such for example as curled hair, felt, glass, wool or the like.

The spider or sleeve member 37 is preferably of brass or brass alloy so that the three plates 30, 31 and 40 may be soldered thereto with the plates positioned respectively against shoulders 35, 41 and 36 on the spider member, as may be clearly seen in Fig. 2. The intermediate plate is thus spaced between the two outermost plates and forms in effect a baffle between the two. The left hand plate (as viewed in Fig. 2) is provided with peripherally spaced holes 32, while the right hand plate 31 is provided with similarly spaced holes 33. These holes permit the passage therethrough of oil occluded or free air.

As will now be apparent, the combined breather and centrifugal oil separator device 29 rotates in the chamber 24 when the crank shaft 9 is rotated. The radially extending walls of the device 29, i. e., the outermost sides of the plates 30 and 31, are spaced from the adjacent walls of the members 15 and 22 by rather small distances, for a purpose to be revealed presently.

The opening 21 in the casing 22 around the crank shaft 9 is sealed by means of a sealing device designated in its entirety by 34.

In operation, the compressor may be driven by any form of prime mover, such for example as an electric motor or internal combustion engine, which may be directly or indirectly connected to the crank shaft 9.

When the compressor is being operated, the space in the crank case chamber above the level of the oil becomes filled with oil occluded air under varying pressure. When the pressure in this space exceeds the ambient pressure outside of the compressor, the oil occluded air will pass to the outside.

According to the arrangement shown, the oil occluded air will first pass through the openings 43 around the roller bearing 10, where in so doing it acts to lubricate the bearing. The air then passes to the chamber 24. Now the clearance space between the breather and oil separator device 29 and the adjacent radial wall of member 15, and between the device 29 and the adjacent radial wall of member 22 is too small to permit effective passage of this oil laden air. This heavy air thus more readily passes through the openings 32 in the left hand plate 30, of the breather device 29, and into the straining material 42.

Now it will be observed that the intermediate plate 40 in the breather and separator device is imperforate and of somewhat smaller outside diameter than the other plates 30 and 31, thus forming a passage between its periphery and the foraminous member 39. As the oil laden air enters the device 29 from the left it must, due to the presence of the baffle or intermediate plate 40, pass outwardly in a radial direction and then around the peripheral edge of plate 40. It may then pass radially inwardly and through the second mass of straining material 42 and to the atmosphere via holes 33 in plate 31, and passages 26 and 27, unseating the check valve 28 as it does so.

When oil laden air from the crank case chamber enters the breather and separator device 29, which is now rotating at crank shaft speed, the oil particles held in suspension in the air are trapped in the air spaces in the straining material 42 and are thus subject to the centrifugal force resulting from the rotary operation of the device. As a result, the oil particles are thrown radially outwardly, through the straining material and the holes in the foraminous member 39, against the outermost wall 44 of chamber 24, where it runs down this wall and through passage 25 back to the crank case chamber 2.

The check valve 28 in the atmospheric passage 27 is for the purpose of insuring a unidirectional flow through the breather, which minimizes the breathing effect in the crank case and prevents entrance of foreign matter from the atmosphere, thereby providing a straining element which requires no attention over a relatively long period of time. The check valve is of such a size with respect to passage 27 that it will readily be urged to and held in seated position by an atmospheric pressure slightly preponderant over the crank case pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a breather and separator device for a compressor having a closed crank case and at least one main bearing supporting a crank shaft, in combination, a centrifugal type breather and separator adapted to separate oil from oil-laden air passed therethrough, means providing for rotation of said breather and separator when said crank shaft is rotated, and means forming an air exhaust path from said crank case to the atmosphere through which oil-laden air in the crank case may pass, said path including passage through both said bearing and said breather and separator.

2. In a breather and separator device for a compressor having a closed crank case and at least one main bearing supporting a crank shaft, in combination, a centrifugal type breather and separator having therein a mass of straining material therein in which oil of oil-laden air passed therethrough is trapped, means for causing rotation of said breather and separator upon rotation of said crank shaft whereby oil trapped in the straining material therein is expelled by centrifugal force, and means establishing a path from the crank case to the atmosphere through which oil-laden air in the crank case may pass, said path being so arranged that the oil-laden air first passes through said bearing to lubricate it and then through said breather and separator to have the oil separated from the air.

3. In a breather and separator device for a compressor having a closed crank case and at least one main bearing supporting a crank shaft, in combination, a casing member forming with said crank case an oil collecting chamber adjacent said bearing, said crank shaft extending through said chamber, a hollow member disposed in said chamber and secured for rotation with said crank shaft, said hollow member having inlet and outlet ports, means for directing oil laden air in the crank case through said bearing and into said inlet ports and then out said outlet ports, and means within said hollow member for causing separation of oil from the carrying air and for then expelling said separated oil into said chamber.

4. In a breather and separator device for a compressor having a closed crank case and at least one main bearing supporting a crank shaft, in combination, a sleeve disposed on and secured to the crank shaft for rotation therewith, a plurality of annular plates secured to said sleeve in axial spaced relation, an annular foraminated member secured to the outer peripheries of the outermost of said annular plates, a mass of straining material disposed in the spaces defined by said plates and said foraminated member, said parts being so arranged and said outermost plates being so ported that oil laden air entering said breather and separator while rotating with said crank shaft is caused to travel a tortuous path whereby the oil is centrifugally separated from the air leaving said breather and separator.

5. In a breather and separator device for a compressor having a closed crank case and at least one main bearing supporting a crank shaft, in combination, a sleeve having three axially spaced shoulders disposed on and secured to the crank shaft for rotation therewith, two annular outermost plates having peripherally spaced ports and an imperforate intermediate plate of slightly smaller diameter butted against said shoulders respectively and secured thereto, an annular foraminated member secured to the outer peripheries of said two outermost plates, a mass of straining material disposed in the spaces defined by the inner surfaces of the two outermost plates and the opposite surfaces of the intermediate plate and the foraminated member, the peripherally spaced ports in said outermost plates being so arranged that oil laden air entering said breather and separator while it is rotating with said crank shaft is caused to travel an irregular path whereby the oil is centrifugally separated from the air leaving said breather and separator.

6. In a breather and separator device for a compressor having a closed crank case and at least one main bearing supporting a crank shaft, in combination, a centrifugal type breather and separator, a casing member forming with said crank case an oil collecting chamber adjacent said bearing, an annular passage in the wall of said chamber which is connected to the atmosphere, said crank shaft extending through said chamber, a centrifugal type breather and separator disposed in said chamber and secured for rotation with said crank shaft and adapted to separate oil from oil laden air passed therethrough and for expelling said separated oil into said chamber, said breather and separator having peripherally spaced inlet ports adjacent said bearing and outlet ports in axial alignment with the annular passage in said chamber.

7. In a breather and separator device for a compressor having a closed crank case and at least one main bearing supporting a crank shaft, in combination, a centrifugal type breather and separator, a casing member forming with said crank case a chamber, an annular passage disposed in the wall of said chamber, means forming a path from said annular passage to the atmosphere, said crank shaft extending through said chamber, a centrifugal type breather and separator disposed in said chamber and secured for rotation with said crank shaft and adapted to separate oil from oil laden air passed therethrough, said breather and separator having inlet ports adjacent said bearing and outlet ports in axial alignment with said annular passage, and valve means in said path for controlling communication therethrough.

8. In a breather and separator device for a compressor having a closed crank case and at least one main bearing supporting a crank shaft, in combination, a centrifugal type breather and separator, a casing member forming with said crank case a chamber, an annular passage formed in the wall of said chamber, an exhaust port connecting said annular passage with the atmosphere, said crank shaft extending through said chamber, a centrifugal type breather and separator disposed in said chamber and secured for rotation with said crank shaft and adapted to separate oil from oil laden air passed therethrough, said breather and separator having inlet ports adjacent said bearing and outlet ports in coaxial alignment with said annular passage, and means in said exhaust port for preventing passage of air from the atmosphere to said annular passage.

9. In a breather and separator device for a compressor having a closed crank case and at least one main bearing supporting a crank shaft, in combination, a centrifugal type breather and separator, a casing member forming with said crank case a chamber, an annular passage formed in the wall of said chamber, an exhaust port connecting said annular passage with the atmosphere, a centrifugal type breather and separator having inlet and outlet ports disposed in said chamber and secured for rotation with said crank shaft and adapted to separate oil from oil laden air passed therethrough said outlet ports being in axial alignment with said annular passage, and a check valve device in said exhaust port adapted to permit flow from the crank case to the atmosphere only.

10. In a breather and separator device for a compressor having a closed crank case and at least one main bearing supporting a crank shaft, in combination, a centrifugal type breather and separator, a casing member forming with said crank case a chamber, an annular passage formed in the wall of said chamber, an exhaust port connecting said annular passage with the atmosphere, said crank shaft extending through said chamber, a centrifugal type breather and separator disposed in said chamber and secured for rotation with said crank shaft and adapted to separate oil from oil laden air passed therethrough, said breather and separator having inlet ports adjacent said bearing and outlet ports in coaxial alignment with said annular passage, said breather and separator also having close fit with the walls of said chamber and thus forming such a restricted air path therebetween that oil laden air entering said chamber from the crank case is caused to substantially all pass into said breather and separator.

GEORGE K. NEWELL.